United States Patent
Ueda

(10) Patent No.: US 7,057,304 B2
(45) Date of Patent: Jun. 6, 2006

(54) DRIVE CONTROL OF HYBRID ELECTRIC VEHICLE

(75) Inventor: Hideo Ueda, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 3 days.

(21) Appl. No.: 11/059,324

(22) Filed: Feb. 17, 2005

(65) Prior Publication Data

US 2005/0184529 A1     Aug. 25, 2005

(30) Foreign Application Priority Data

Feb. 25, 2004     (JP)     ............... 2004-050046

(51) Int. Cl.
    *H20P 9/04*     (2006.01)
(52) U.S. Cl. ............... 290/40 C; 290/40 A; 290/40 D; 180/65.1
(58) Field of Classification Search ............. 290/40 C, 290/40 A, 40 D; 180/65.1
See application file for complete search history.

(56) References Cited

U.S. PATENT DOCUMENTS

| | | | |
|---|---|---|---|
| 6,522,024 B1 * | 2/2003 | Takaoka | 290/40 C |
| 6,617,704 B1 * | 9/2003 | Tomikawa | 290/40 C |
| 6,661,109 B1 * | 12/2003 | Fukasaku | 290/40 C |
| 6,856,035 B1 * | 2/2005 | Brsndon | 290/40 C |

FOREIGN PATENT DOCUMENTS

| | | |
|---|---|---|
| JP | 3045063 B2 | 3/2000 |
| JP | 2000-341804 A | 12/2000 |
| JP | 2004-138158 A | 5/2004 |
| JP | 2004-360608 A | 12/2004 |

* cited by examiner

*Primary Examiner*—Darren Schuberg
*Assistant Examiner*—Iraj A. Mohandesi
(74) *Attorney, Agent, or Firm*—Foley & Lardner LLP

(57) ABSTRACT

A drive device for a hybrid electric vehicle is provided with an engine (2) connected to a planet carrier (C) of a planetary gear set (1), a first motor/generator (3) and drive wheels (8) connected to a ring gear (R), a second motor/generator (4) connected to a sun gear (S), and a battery (24) that is electrically connected to the first motor/generator (3) and to the second motor/generator (4). When a failure of the first motor/generator (3) or the second motor/generator (4) is detected, a controller (21) restricts rotation (S5, S105) of the second motor/generator (4), through a clutch (11), thus assuring running of the vehicle and charging of the battery (24) by engine output.

11 Claims, 11 Drawing Sheets

1 PLANETARY GEAR SET
4 SECOND MOTOR/GENERATOR
6 DIFFERENTIAL
11 ELECTROMAGNETIC CLUTCH

1 PLANETARY GEAR SET
4 SECOND MOTOR/GENERATOR
6 DIFFERENTIAL
11 ELECTROMAGNETIC CLUTCH

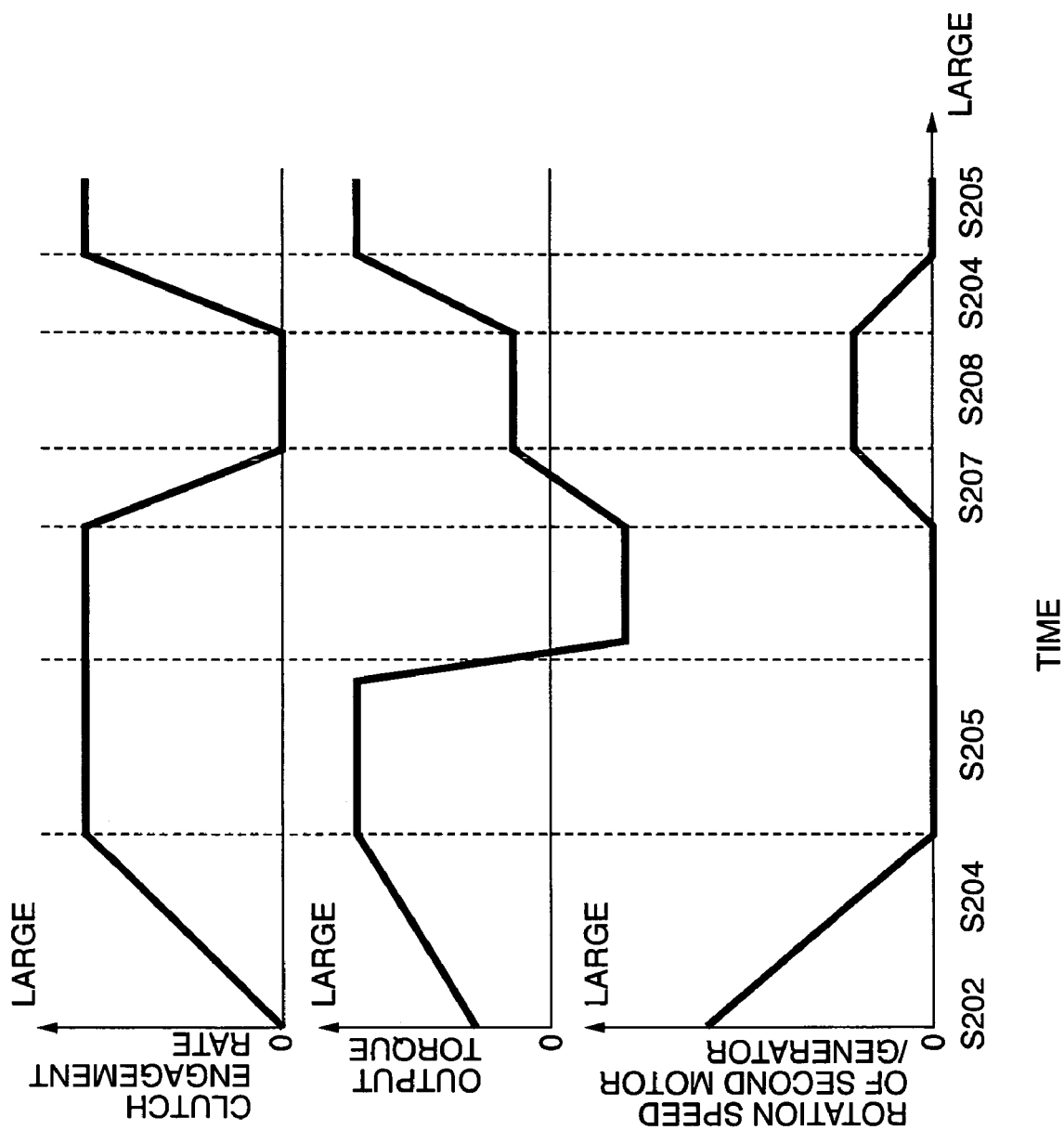

DRIVE CONTROL OF HYBRID ELECTRIC VEHICLE

FIELD OF THE INVENTION

This invention relates to a drive device for a hybrid electric vehicle.

BACKGROUND OF THE INVENTION

Japanese Patent No. 3045063 discloses a drive device used for a hybrid electric vehicle, in which one of a first motor/generator and an engine is connected to a sun gear of a planetary gear set, and the other of the first motor/generator and the engine is connected to a planet carrier of the planetary gear set. A second motor/generator is connected to an output shaft of a ring gear. The first motor/generator is mainly used as a generator, while the second motor/generator is mainly used for running the vehicle. The connected planetary gear set functions as a differential mechanism. A portion of engine output is allotted for power generation, and electric power generated by the generator is output from the motor. The planetary gear set thus functions as a continuous variable transmission or a mechanism for increasing and decreasing output torque.

SUMMARY OF THE INVENTION

The following problems appear when a failure develops in any of the motor/generators in the drive device.

First, when there is a failure in the first motor/generator, the output torque of the engine becomes unable to be transmitted to the ring gear, and only torque from the second motor/generator is transmitted to the ring gear. When running by the motor, running must be stopped after a certain amount of running in order to prevent battery overcharging. The phrase "failure in the first motor/generator" indicates states where the first motor/generator does not rotate at all or does not rotate sufficiently even when electric power is supplied but rotates upon input of a rotation torque from the outside.

When the first motor/generator fails, engine torque is transmitted neither to the first motor/generator nor to the second motor/generator, and neither the first motor/generator nor the second motor/generator can perform power generation.

In addition, when the first motor/generator fails due to motor running when the engine is running idle or in a stopped state, the first motor/generator cannot thereafter supply torque for starting the engine.

Failure of the second motor/generator will be explained next. The phrase "failure of the second motor/generator" indicates states where, although the second motor/generator rotates when a rotation torque is input to the second motor/generator from the outside, there is absolutely no, or only insufficient, power generation.

When the second motor/generator fails, torque transmitted to the ring gear is determined according to a correlation between torque that the first motor/generator transmits to the sun gear and torque that the engine transmits to the planet carrier. The first motor generator must perform power generation in order to make the sun gear generate torque. Running must be stopped in this state as well after a certain amount of running in order to prevent battery overcharging.

In addition, when trouble occurs in a controller that controls the first motor/generator and the second motor generator, the first motor/generator and the second motor/generator run idle, and the output torque of the engine cannot be transmitted to the ring gear as a drive force.

It is therefore an object of this invention to make it possible for a hybrid electric vehicle to run by engine output when some trouble occurs in a motor/generator of the hybrid electric vehicle, in which two motor/generators and an internal combustion engine are connected through a differential mechanism.

In order to achieve the above object, this invention provides a drive device for a hybrid electric vehicle. The drive device comprises a differential device comprising a first rotation element, a second rotation element, and a third rotation element that rotates according to relative rotation of the first rotation element and the second rotation element, an internal combustion engine connected to one of two rotation elements including the third rotation element, a first motor/generator and drive wheels that are connected to the other of the two rotation elements, a second motor/generator connected to a rotation element other than the two rotation elements, a battery that is electrically connected to the first motor/generator and to the second motor/generator, a restricting member that restricts rotation of the second motor/generator, and a programmable controller.

The controller is programmed to detect a failure in one of the first motor/generator and the second motor/generator, and restrict rotation of the second motor/generator through the restricting member, when a failure is detected.

This invention also provides a control method of a drive device comprising a differential device comprising a first rotation element, a second rotation element, and a third rotation element that rotates according to relative rotation of the first rotation element and the second rotation element, an internal combustion engine connected to one of two rotation elements including the third rotation element, a first motor/generator and drive wheels that are connected to the other of the two rotation elements, a second motor/generator connected to a rotation element other than the two rotation elements, a battery that is electrically connected to the first motor/generator and to the second motor/generator, and a restricting member that restricts rotation of the second motor/generator.

The control method comprises detecting a failure in one of the first motor/generator and the second motor/generator, and restricting rotation of the second motor/generator through the restricting member, when a failure is detected.

This invention also provides a drive device as above described, further comprising, a hybrid controller programmed to control electric power supplied from the battery and electric power charged to the battery, an engine controller programmed to control torque output by the engine, and a third controller programmed to detect a failure of the hybrid controller.

The engine controller is further programmed to restrict rotation of the second motor/generator, through the restricting member, when a failure of the hybrid controller is detected.

The details as well as other features and advantages of this invention are set forth in the remainder of the specification and are shown in the accompanying drawings.

BRIEF DESCRIPTION OF THE DRAWINGS

FIGS. 7A to 7C are timing charts that show results of control performed according to FIGS. 6A to 6G.

DESCRIPTION OF THE PREFERRED EMBODIMENTS

Figure 1:
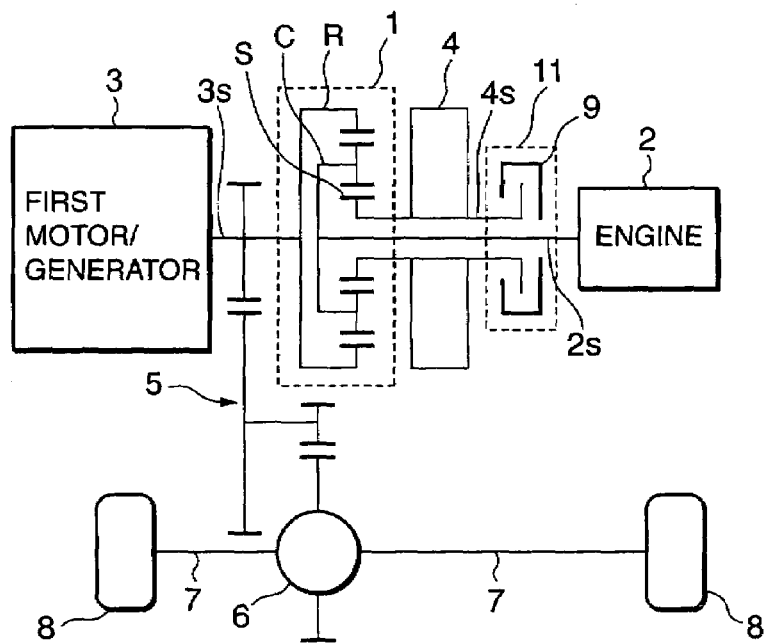
FIG. 1 is a schematic diagram that explains a configuration of a drive device for a hybrid electric vehicle according to this invention.

Referring to FIG. 1, a drive device for a hybrid electric vehicle includes a planetary gear set 1, an internal combustion engine 2, a first motor/generator 3, and a second motor/generator 4.

The first motor/generator 3 is mainly used to supply driving force for vehicle running and for regenerative power generation. The second motor/generator 4 is mainly used as a generator and an engine starter motor.

The planetary gear set 1 includes a sun gear S, a planet carrier C, and a ring gear R.

A rotation shaft 2S of the engine 2 is connected to the planet carrier C, and a rotation shaft 3S of the first motor/generator 3 is connected to the ring gear R, and a rotation shaft 4S of the second motor/generator 4 is connected to the sun gear S. The sun gear S corresponds to a first rotation element as described in the appended claims, the ring gear R corresponds to a second rotation element as described in the appended claims, and the planet carrier C corresponds to the third rotation element as described in the appended claims.

The rotation shaft 3S of the first motor/generator 3 is connected to drive wheels 8 through a reduction gear unit 5, a differential 6, and a drive shaft 7. The rotation shaft 3S always rotates together with the drive wheels 8 during vehicle running.

An electromagnetic clutch 11 that fixes the sun gear S to a fixing portion 9 is provided to the drive device. The electromagnetic clutch 11 engages when supplied with electricity, restricting rotation of the sun gear S and the second motor/generator 4. The fixing portion 9 is configured by a member that supports the rotation shaft 4S of the second motor/generator 4. The electromagnetic clutch 11 corresponds to a restraining member as described in the appended claims.

Figure 2:
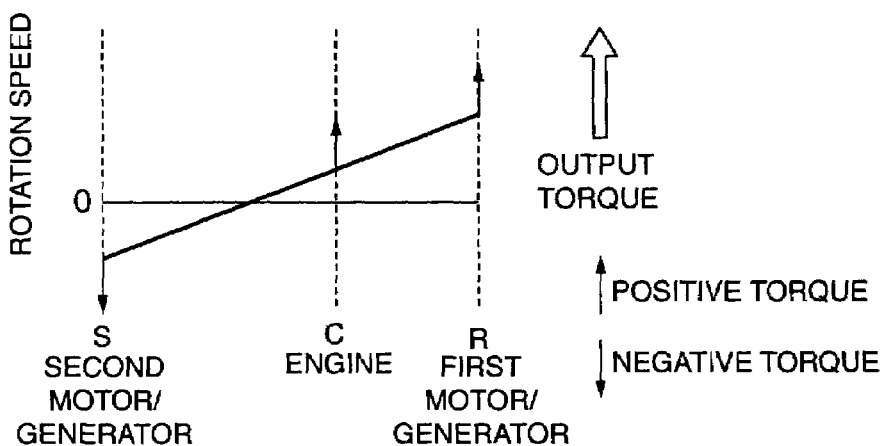
FIG. 2 is a collinear diagram of a planetary gear set applied to the drive device.

Referring to FIG. 2 next, torque relationships between the sun gear S, the planet carrier C, and the ring gear R will be explained next for a state where the electromagnetic clutch 11 is released. The spacings between each of the elements on the horizontal axis in FIG. 2 correspond to gear ratios between the elements. The torque relationships between the sun gear S, the planet carrier C, and the ring gear R are, in other words, torque relationships between the second motor/generator 4, the engine 2, and the first motor/generator 3. In FIG. 2, the length of each arrow indicates the magnitude of a torque. Arrows pointing upward indicate output torques, while arrows pointing downward indicate input torques. FIG. 2 indicates a state where the engine 2 and the first motor/generator 3 output torques, a portion of the output torques is used to drive the vehicle, and the remainder of the output torques is used for power generation with the second motor/generator 4.

A drive torque of the vehicle is therefore the sum of a portion of the engine torque, and a portion of the output torque of the first motor/generator 3. The allocation ratio of these output torques depends on the balance of the driving torque required by the vehicle and the power generation load of the second motor/generator 4.

Figure 3:
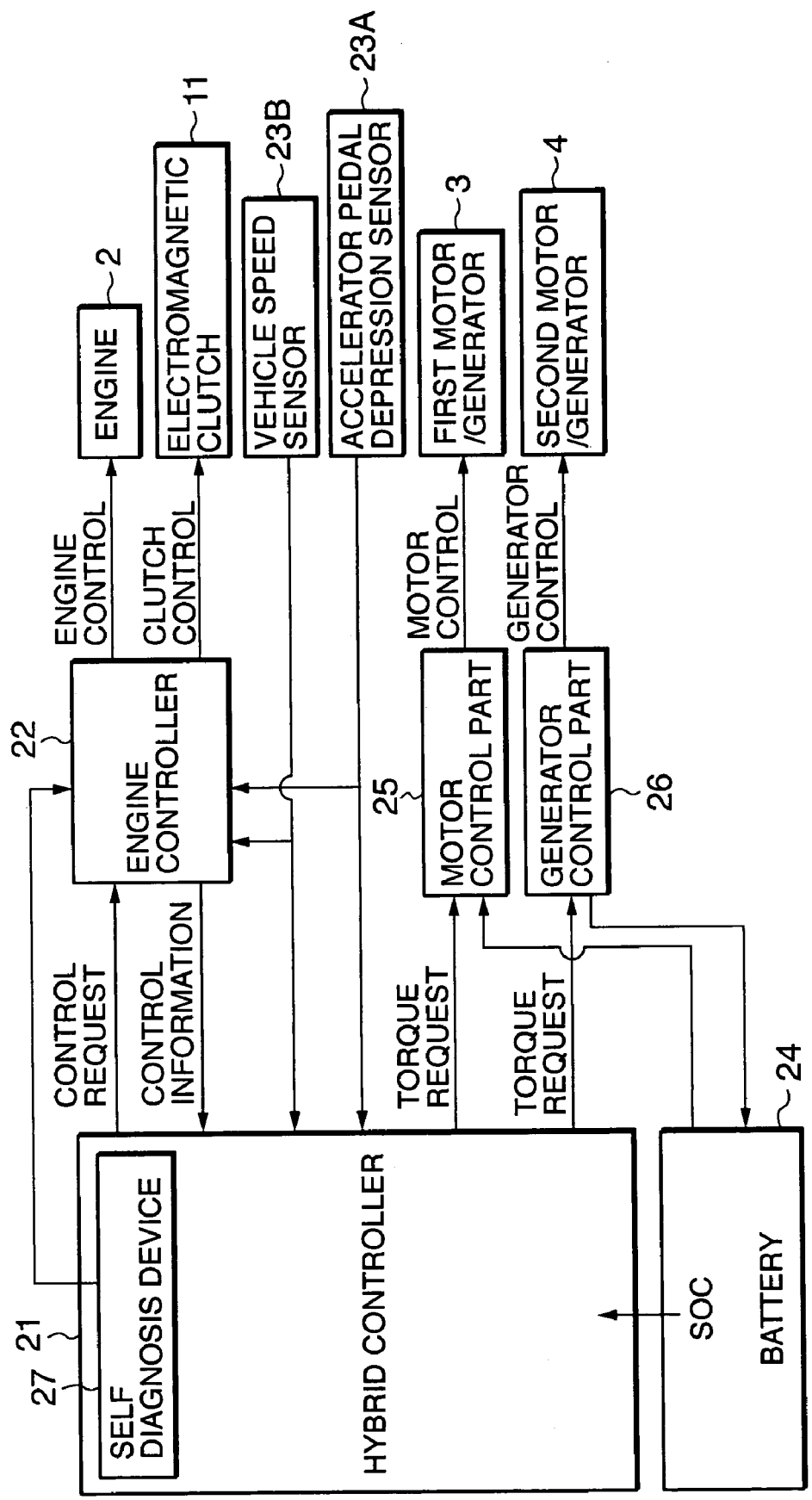
FIG. 3 is a block diagram that explains a configuration of a control system of the drive device.

Referring to FIG. 3, a control system of the drive device according to this invention will be explained next.

The control system includes a hybrid controller 21 and an engine controller 22. The hybrid controller 21 and the engine controller 22 are each configured by a microcomputer including a central processing unit (CPU), read only memory (ROM), random access memory (RAM), and an input-output interface (I/O interface). It is also possible for the controller 21 to be configured by a plurality of microcomputers, and it is also possible for the controller 22 to be configured by a plurality of microcomputers. Furthermore, it is possible to integrate the two controllers 21 and 22 into one control unit.

Detection data from an accelerator pedal depression sensor 23A that detects the amount that an accelerator pedal of the vehicle is depressed, and a vehicle speed sensor 23B that detects vehicle speed are input to the hybrid controller 21 and to the engine controller 22 as signals.

The hybrid controller 21 sets a target driving force for the vehicle based on the amount that the accelerator pedal is depressed. The torques output from the engine 2 and the first motor/generator 3 are controlled based on a pattern set in advance and on the vehicle speed, so that the target driving force can be obtained. Further, a state of charge (SOC) of a battery 24 is input to the hybrid controller 21. The hybrid controller 21 determines whether or not it is necessary to charge the battery 24 based on the SOC. When charging is necessary, the target driving force is set while taking into consideration the driving torque of the second motor/generator 4 needed for charging. The output torque control described above is conventionally known, and an explanation thereof is accordingly omitted here.

The control system further includes a motor control portion 25 that controls electric power supplied from the battery 24 to the first motor/generator 3 in response to an output control signal from the hybrid controller 21, and a generator control portion 26 that controls electric power supplied from the second motor/generator 4 to the battery in response to the output control signal from the hybrid controller 21. The motor control portion 25 and the generator control portion 26 are each configured by an inverter or a converter.

On the other hand, the engine controller 22 performs output control of the engine 2 according to a torque control command from the hybrid controller 21. Output control of the engine 2 is performed by controlling an electronic throttle provided to the engine 2, for example, and this control is also publicly known. The engine controller 22 controls the engagement and the release of the electromagnetic clutch 11 according to a clutch control command from the hybrid controller 21.

When the hybrid controller 21 has a failure, the engine controller 22 computes the target driving force based on the signal from the accelerator pedal depression sensor 23A, and controls the output torque of the engine 2 so as to obtain the target driving force.

Simultaneously, the engine controller 22 releases the electromagnetic clutch 11.

A self-diagnostic device 27 is built into the hybrid controller 21 in order to diagnose whether or not the hybrid controller 21 has failed. The self-diagnostic device 27 is configured by a microcomputer separate from the microcomputers described above. When the hybrid controller 21 is determined to have failed, the self-diagnostic device 27 outputs a signal indicating that the hybrid controller 21 has failed to the engine controller 22. The phrase "the hybrid controller 21 has failed" means a state where the hybrid controller 21 cannot implement control, in other words, a state where an output signal that should be returned in response to an input signal is not output.

Figure 4A:
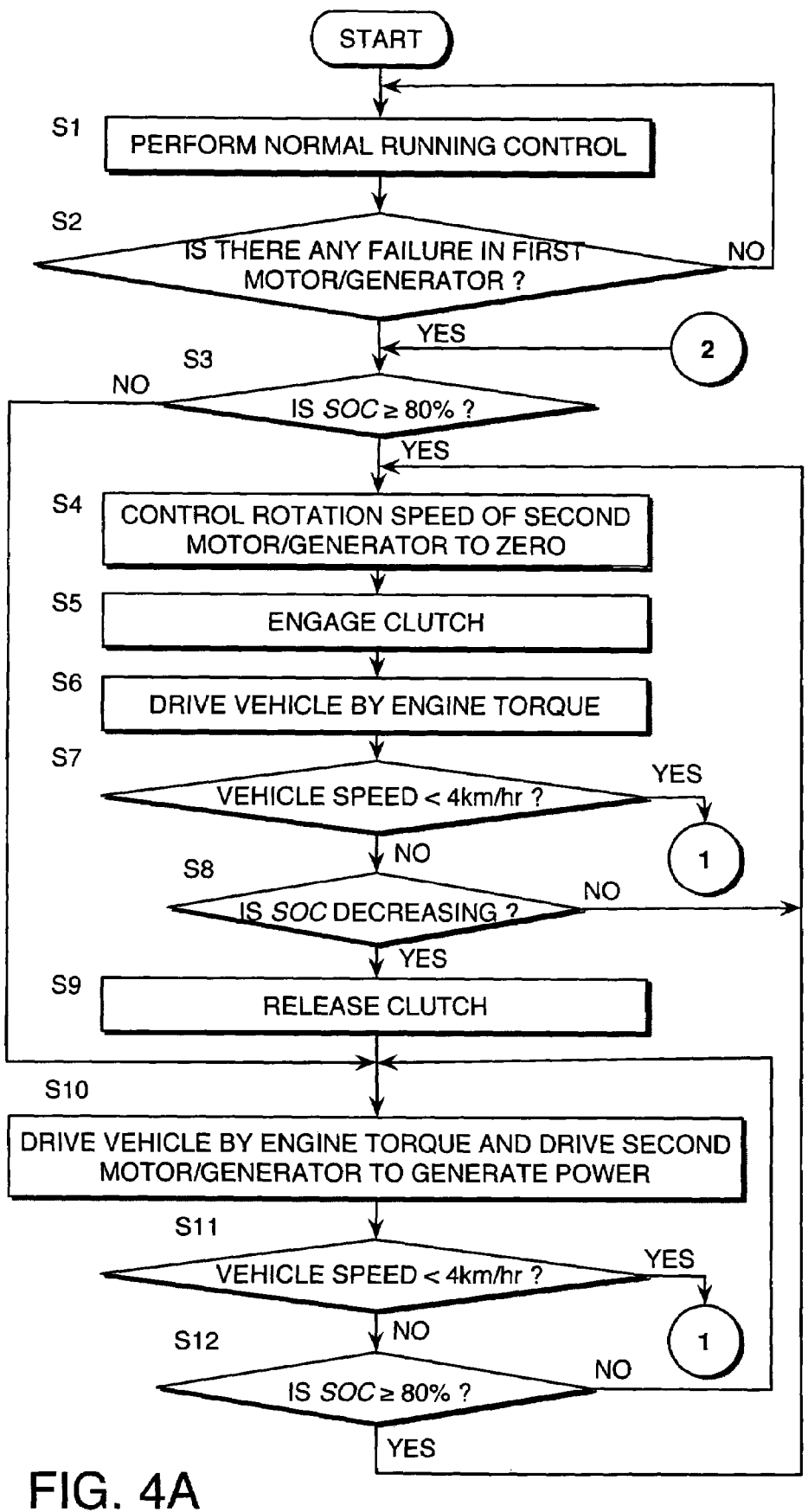
FIGS. 4A and 4B are flowcharts that explain a failsafe control routine that a controller executes during motor failure.
Figure 4B:
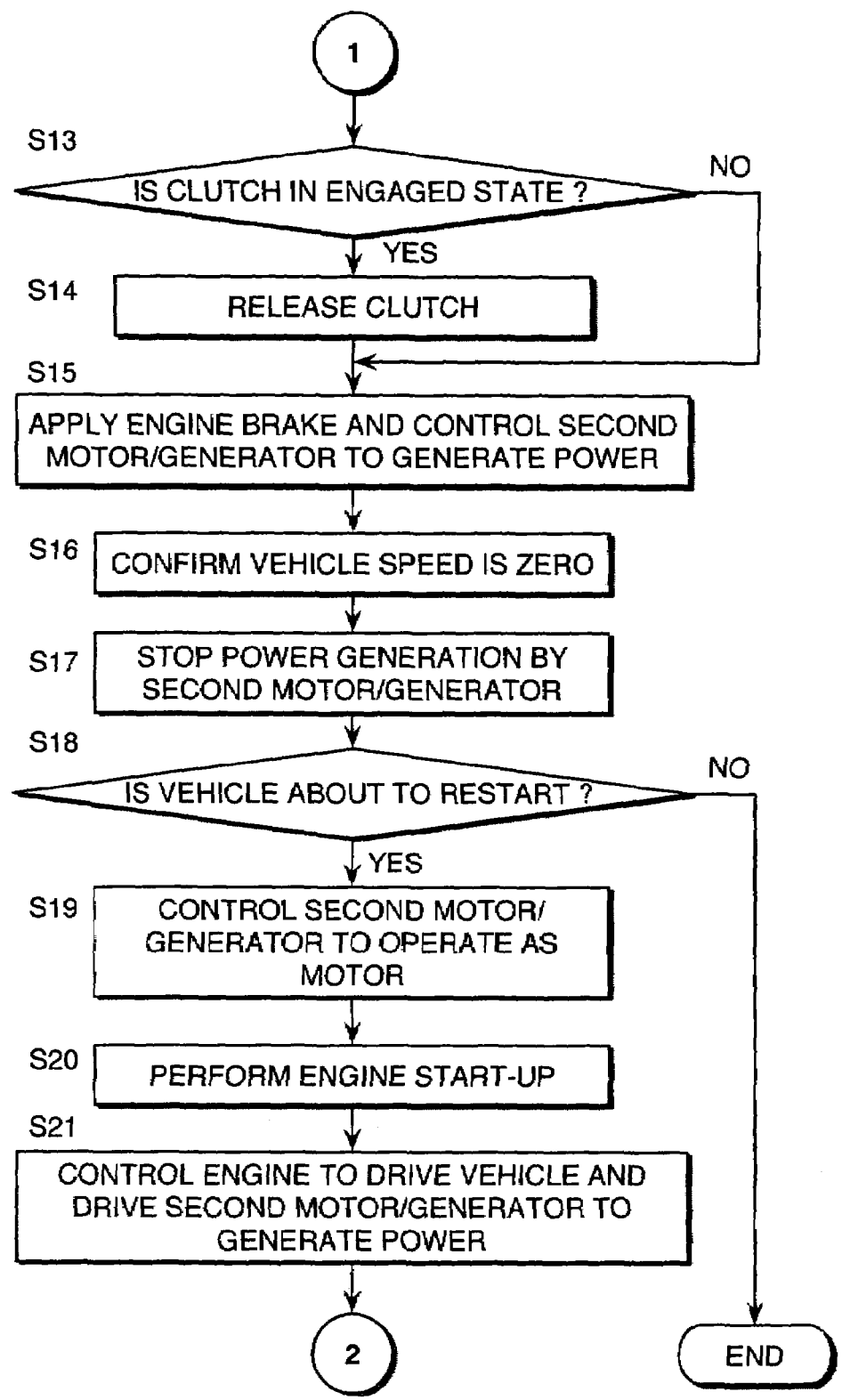

Referring to FIGS. 4A to 4J, control of the drive device control system relating to failure of the first motor/generator 3 will be explained next. It should be noted that FIGS. 4A and 4B show a control routine implemented by the hybrid controller 21, and that FIGS. 4C to 4J show the rotation speed and torque of each gear achieved by executing each process of the control routine. Execution of the routine is started at the same time as the hybrid electric vehicle begins to move, and continues until the hybrid electric vehicle stops running.

Figure 4C:
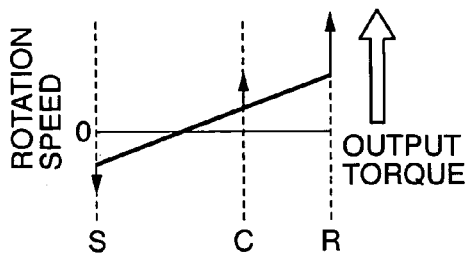
FIGS. 4C to 4J are collinear diagrams corresponding to processes in the flowcharts of FIGS. 4A and 4B, according to this invention.

In a step S1, the hybrid controller 21 performs normal running control of the drive device by outputting control commands to the motor control portion 25, the generator control portion 26, and the engine controller 22. The phrase "normal running" means a state where the engine 2 and the first motor/generator 3 output torques, a portion of the torques is used in driving the vehicle, and the remainder of the torques is used in power generation by the second motor/generator 4. The electromagnetic clutch 11 is released. Torque is distributed as shown in FIG. 4C based on this control. This is the same as the relationship of FIG. 2.

In a step S2, the hybrid controller 21 determines whether or not the first motor/generator has failed. Specifically, the first motor/generator 3 is determined to have failed when the torque output by the first motor/generator 3 is outside of a range ±20% of a rated output torque set in response to input electric power. The first motor/generator 3 is determined to be operating normally when the output torque is within this range. It should be noted that the self-diagnostic device 27 also performs monitoring of the torque output by the first motor/generator 3 in parallel with the hybrid controller 21.

The hybrid controller 21 continues with the normal running control of the step S1 when the first motor/generator 3 is found to be operating without a failure.

Figure 4D:
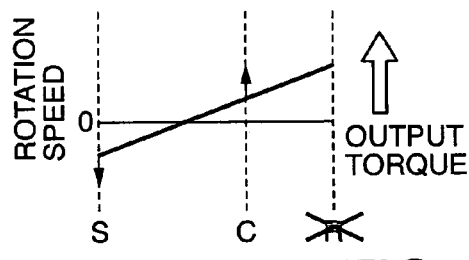

Referring to FIG. 4D, when, on the other hand, the first motor/generator 3 has failed and the torque output by the first motor/generator 3 becomes zero, the vehicle runs by only the engine torque transmitted to the ring gear R, which is equivalent to the difference between the output torque of the engine 2 and the torque consumed by the second motor/generator 4.

When the first motor/generator 3 is determined to have failed, the hybrid controller 21 determines in a step S3 whether or not the SOC of the battery 24 is larger than a predetermined amount. The predetermined amount is set here to 80 percent of a full charge.

When the determination of the step S3 is positive, the hybrid controller 21 performs the processing of a step S4. When the3 determination of the step S3 is negative, the processing of a step S10 is performed.

In the step S4, the hybrid controller 21 sets the rotation speed of the second motor/generator 4 to zero by outputting a control signal to the generator control portion 26.

Figure 4E:
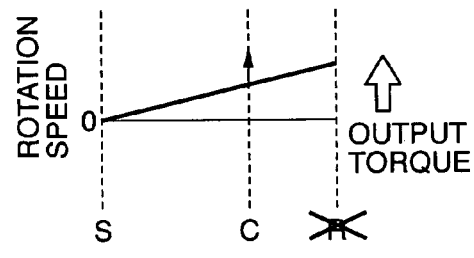

Next, in a step S5, the hybrid controller 21 outputs a control request to the engine controller 22, and the engine controller 22 engages the electromagnetic clutch 11. As a result, the sun gear S is fixed to the fixing portion 9, and thereafter, as shown in FIG. 4E, the entire amount of torque output by the engine 2 is output to the drive wheels 8 through the ring gear R.

Next, in a step S6, the hybrid controller 21 outputs a control request to the engine controller 22, causing the engine controller 22 to perform output control of the engine 2 based on the accelerator pedal depression amount and the vehicle speed. The vehicle thus runs on only the torque output by the engine 2.

Next, in a step S7, the hybrid controller 21 determines whether or not the vehicle is in a state immediately prior to stopping. Specifically, a determination is made as to whether or not the vehicle running speed is less than a predetermined speed. The predetermined speed is set to 4 kilometers/hour here.

When the vehicle running speed is less than the predetermined speed, the hybrid controller 21 performs the processing of a step S13 in FIG. 4B. When the vehicle running speed is not below the predetermined speed, the hybrid controller 21 determines in a step S8 whether or not the SOC shows a decrease.

When the SOC shows no decrease, the hybrid controller 21 repeats the processings from the step S4 onward. When the SOC shows a decrease, the hybrid controller 21 outputs a control request to the engine controller 22 in a step S9, causing the engine controller 22 to release the electromagnetic clutch 11. As a result, the sun gear S, which had been fixed, becomes free to rotate.

Figure 4F:
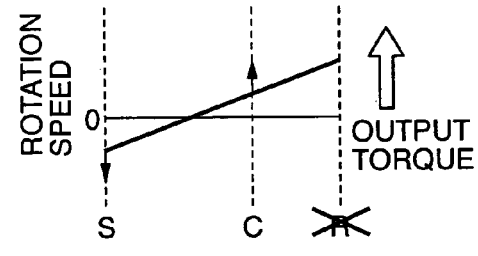

Next, in a step S10, the hybrid controller 21 outputs a control signal to the generator control portion 26, causing the second motor/generator 4 to perform power generation, thus performing charging of the battery 24. Referring to FIG. 4F, as a result, the torque output by the engine 2 is again distributed to vehicle running and to power generation by the second motor/generator 4, and charging of the battery 24 is performed in parallel with vehicle running.

Next, in a step S11, the hybrid controller 21 determines whether or not the vehicle is in a state immediately prior to stopping. Specifically, a determination is made as to whether or not the vehicle running speed is less than a predetermined speed. The determination here is identical to the determination of the step S7. When the vehicle running speed is less than the predetermined speed, the hybrid controller 21 performs the processing of the step S13 in FIG. 4B. When the vehicle running speed is not less than the predetermined speed, in a step S12, the hybrid controller 21 determines whether or not the SOC of the battery 24 is larger than a predetermined amount. This determination is identical to the determination of the step S3. When the SOC of the battery is greater than the predetermined amount, the hybrid controller 21 performs the processings from the step S4 onward. In other words, power generation by the second motor/generator 4 is stopped, and the entire amount of torque output by the engine 2 is used in running the vehicle.

On the other hand, when the SOC of the battery 24 is not larger than the predetermined amount, the hybrid controller 21 repeats the processings from the step S10 onward. In other words, charging of the battery 24 is performed in parallel with running of the vehicle.

Thus, when a failure occurs in the first motor/generator 3, the hybrid controller 21 uses the output of the engine 2 solely for vehicle running, or commonly for both vehicle running and charging of the battery 24, based on the SOC of the battery 24.

Referring to FIG. 4B, when it is determined in the processes described above in the step S7 or in the step S11 that the vehicle running speed is less than the predetermined speed, the hybrid controller 21 determines in the step S13 whether or not the electromagnetic clutch 11 is in an engaged position. When the electromagnetic clutch 11 is in an engaged position, in a step S14, the hybrid controller 21 outputs a control request to the engine controller 22, releasing the electromagnetic clutch 11.

When the sun gear S is fixed, the rotation torque input from the drive wheels 8 to the ring gear R during deceleration is input to the engine 2 exclusively through the planet carrier C, and rotational resistance of the engine 2 acts as an engine brake on the ring gear R. In other words, a state results where the drive wheels 8 and the engine 2 are directly connected according to a fixed gear ratio.

Figure 4G:
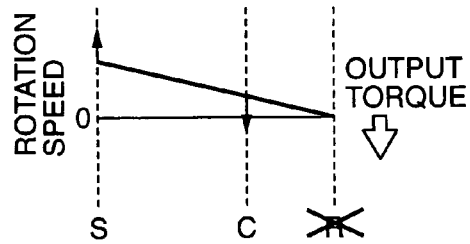

The rotation speed of the engine 2 therefore drops below an idling rotation speed when the vehicle running speed decreases to become equal to or less than the predetermined speed, and an engine stall may occur as a result. Releasing of the electromagnetic clutch 11 is performed in the step S14 in order to avoid such engine stall. Referring to FIG. 4G, when the electromagnetic clutch is released, a portion of the rotation torque of the ring gear R is transmitted to the second motor/generator 4, and the second motor/generator 4 performs regenerative power generation.

Next, in a step S15, the hybrid controller 21 controls the regenerative power generation of the second motor/generator 4 by outputting a control signal to the generator control portion 26, thereby decreasing rotation of the drive wheels 8 through the ring gear R due to rotational resistance accompanying the regenerative power generation by the second motor/generator 4 while the engine 2 maintains an idling rotation speed. In the step S13, when the electromagnetic clutch 11 is not in an engaged position, that is, when the electromagnetic clutch 11 is already released, the hybrid controller 21 skips the processing of the step S14 and performs the processing of the step S15.

Next, in a step S16, the hybrid controller 21 confirms that the vehicle running speed has become zero.

Figure 4H:
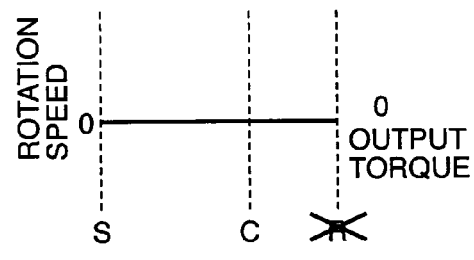

Next, in a step S17, the hybrid controller 21 stops regenerative power generation of the second motor/generator 4, and outputs a signal to the engine controller 22, stopping rotation of the engine 2. Referring to FIG. 4H, as a result, the ring gear R, the planet carrier C, and the sun gear S all stop rotating.

Next, in a step S18, the hybrid controller 21 determines whether or not operations to restart the vehicle are underway. Specifically, the hybrid controller 21 determines whether or not the accelerator pedal has been depressed from the accelerator pedal depression amount.

When the determination made in the step S18 is negative, the hybrid controller 21 ends the routine.

Figure 4I:
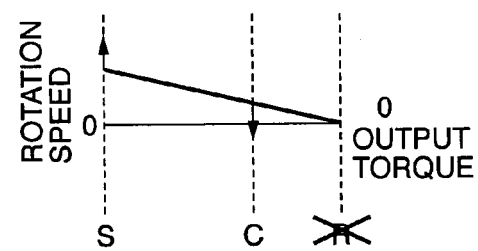

When the determination made in the step S18 is positive, in a step S19, the hybrid controller 21 outputs a control signal to the generator control portion 26, operating the second motor/generator 4 as a motor by the electric power of the battery 24. Referring to FIG. 4I, cranking of the engine 2 is performed from the sun gear R, through the planet carrier C.

Next, in a step S20, the hybrid controller 21 outputs a signal to the engine controller 22, starting the engine 2.

Figure 4J:
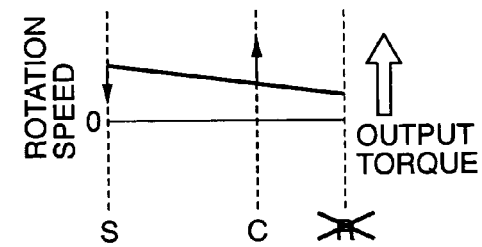

When the engine 2 starts, in a step S21, the hybrid controller 21 switches operation of the second motor/generator 4 from the motor to the generator, causing the second motor/generator 4 to perform power generation with torque that the engine 2 transmits from the planet carrier C through the Sun gear S. At the same time, the engine 2 transmits torque to the drive wheels 8 from the planet carrier C through the ring gear R, causing the vehicle to start moving. The torque output by the engine 2 is therefore distributed to both the sun gear S and the ring gear R, as shown in FIG. 4J.

After completing the processing of the step 21, the hybrid controller 21 repeats the processings from the step S3 onward.

By executing this routine, rotation of the second motor/generator 4 is fixed by the electromagnetic clutch 11 when there is a failure in the first motor/generator 3, with the torque output by the engine 2 being used to run the vehicle. Further, when the SOC of the better 24 decreases, the electromagnetic clutch 11 is released, and the battery 24 can be charged by using the torque output by the engine 2 to perform power generation in the second motor/generator 4.

Figure 5A:
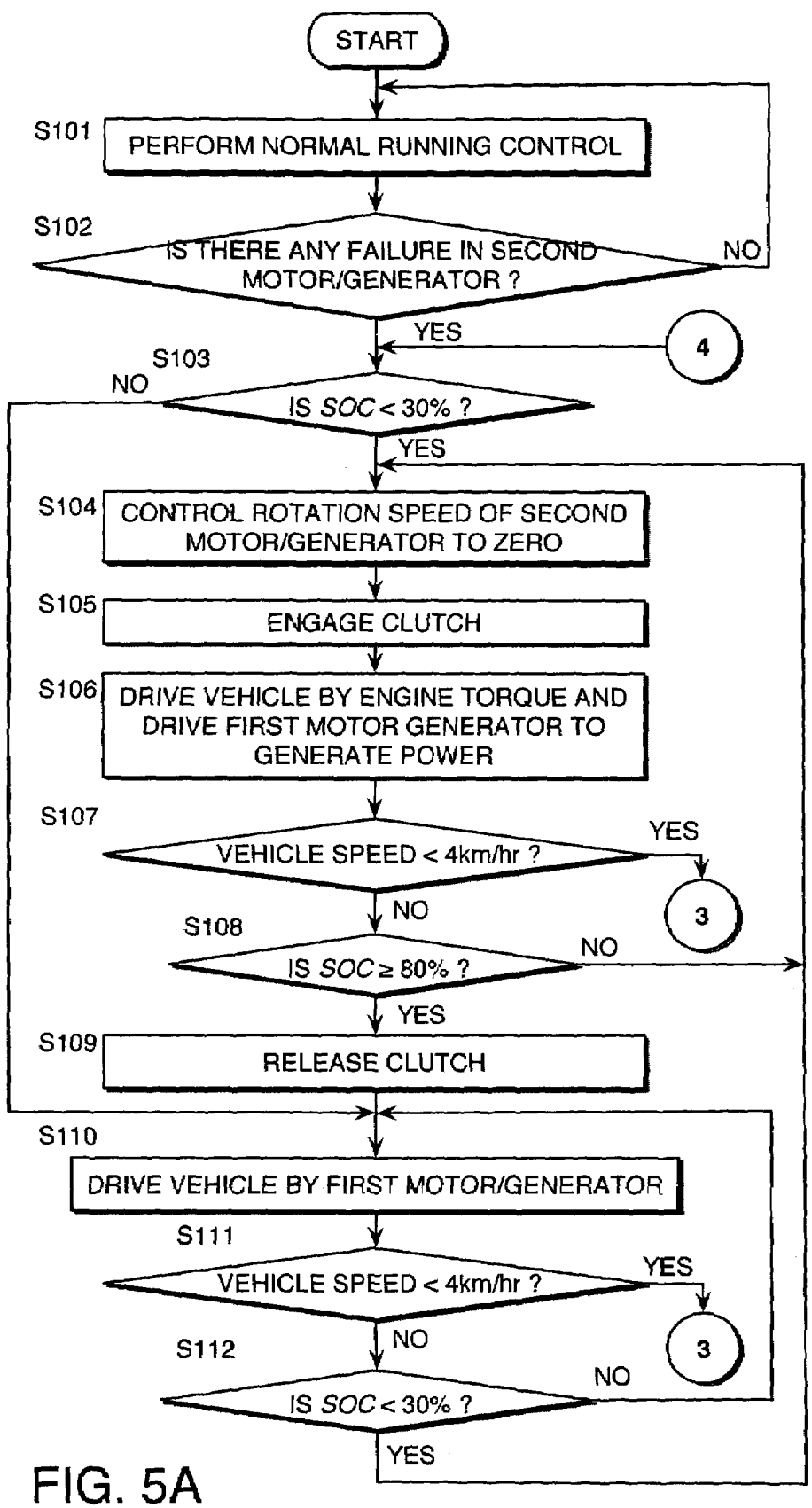
FIGS. 5A to 5J are diagrams similar to FIGS. 4A to 4J, showing control during generator failure.
Figure 5B:
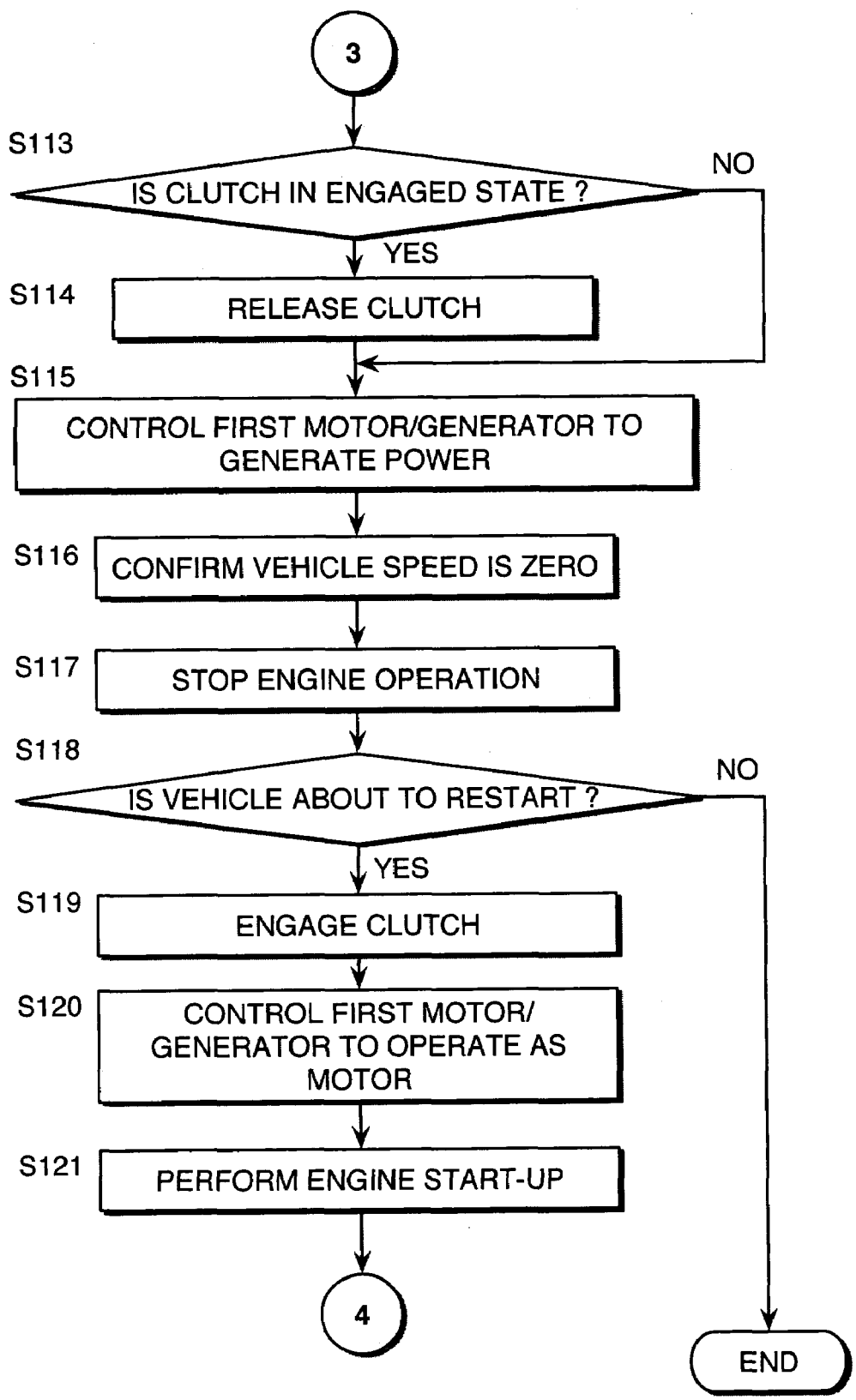

Referring to FIGS. 5A to 5J, control of the drive device by the control system relating to failure of the second motor/generator 4 will be explained next. It should be noted that FIGS. 5A and 5B show a control routine executed by the hybrid controller 21, and that FIGS. 5C to 5J show the rotation speed and torque of each gear achieved by executing each process. Execution of this routine is also started at the same time as the hybrid electric vehicle begins to move, and continues until the hybrid electric vehicle stops running.

Figure 5C:
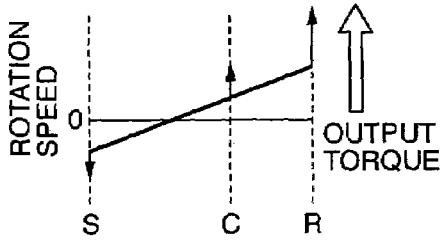

In a step S101, the hybrid controller 21 performs normal running control of the drive device by outputting control commands to the motor control portion 25, the generator control portion 26, and the engine controller 22. The normal running control involves the same processing as that of the step S1 of FIG. 4A. Torque is distributed as shown in FIG. 5C based on this control, and the second motor/generator 4 performs power generation.

In a step S102, the hybrid controller 21 determines whether or not the second motor/generator 4 has failed. Specifically, the hybrid controller 21 determines that a failure has occurred when an electric current output by the second motor/generator 4 is outside of a range of ±20% of a rated current for the second motor/generator 4 set according to rotation speed.

When the output current is within this range, the second motor/generator 4 is determined to be operating without a failure. It should be noted that the self-diagnostic device 27 also performs monitoring of the electric current output by the second motor/generator 4 in parallel with the hybrid controller 21.

When the second motor/generator 4 is found to be operating without a failure, the hybrid controller 21 continues with the normal running control of the step S101.

Figure 5D:
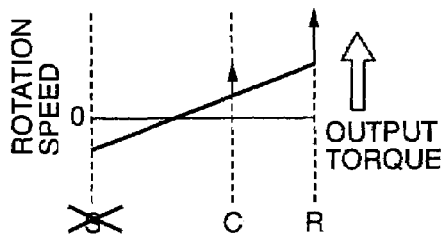

Referring to FIG. 5D, it should be noted that the rotation speed relationship does not change from its normal relationship even when there is a failure in the second motor/generator 4 but the current output by the second motor/generator 4 becomes zero.

Upon determination that there has been a failure in the second motor/generator 4, in a step S103, the hybrid controller 21 determines whether or not the SOC of the battery 24 is less than a predetermined amount. The predetermined amount is set here to 30 percent of a full charge.

When the determination of the step S103 is positive, the hybrid controller performs the processing of a step S104. When the determination of the step S103 is negative, the hybrid controller 21 performs the processing of a step S110.

In the step S104, the hybrid controller 21 sets the rotation speed of the second motor/generator 4 to zero by outputting a control signal to the generator control portion 26.

Next, in a step S105, the hybrid controller 21 outputs a control request to the engine controller 22, and the engine controller 22 causes the electromagnetic clutch 11 to engage. As a result, the sun gear S is fixed to the fixing portion 9. The entire amount of the torque output by the engine 2 is thus transmitted to the ring gear R.

Figure 5E:
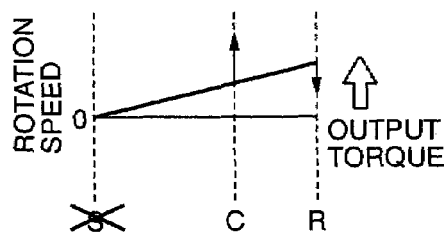
Figure 5F:
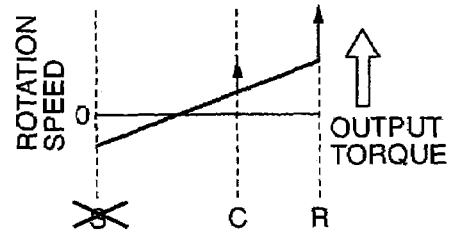

Next, in a step S106, the hybrid controller 21 outputs a control signal to the motor control portion 25, thus driving the first motor/generator 3 as a generator. Referring to FIG. 5E the torque output by the engine 2 is therefore used in driving the drive wheels 8 and in power generation by the first motor/generator 3.

Next, in a step S107, the hybrid controller 21 determines whether or not the vehicle is in a state immediately prior to stopping. Specifically, the hybrid controller 21 determines whether or not the vehicle running speed is less than a predetermined speed. The predetermined speed is set to 4 kilometers/hour here.

When the vehicle running speed is less than the predetermined speed, the hybrid controller 21 performs the processing of a step S113 of FIG. 5B. When the vehicle running speed is not less than the predetermined speed, the hybrid controller 21 determines in a step S108 whether or not the SOC of the battery 24 has reached a predetermined amount. The predetermined amount is set to 80 percent of a full charge here.

When the SOC has not reached the predetermined amount, the hybrid controller 21 repeats the processings from the step S104 onward. When the SOC has reached the predetermined amount, in a step S109, the hybrid controller 21 outputs a control request to the engine controller 22, causing the engine controller 22 to release the electromagnetic clutch 11. As a result, rotation of the sun gear S, which had been fixed, becomes free.

Next, in a step S110, the hybrid controller 21 outputs a control signal to the motor control portion 25, thus performing drive of the drive wheels 8 by only the output of the first motor/generator 3. The engine 2 rotates in an idling state. Rotation of the sun gear S becomes free, and the second motor/generator 4 consequently runs idle.

Next, in a step S111, the hybrid controller 21 determines whether or not the vehicle is in a state immediately prior to stopping. Specifically, the hybrid controller 21 determines whether or not the vehicle running speed is less than a predetermined speed. The determination here is identical to the determination of the step S107.

When the vehicle running speed is less than the predetermined speed, the hybrid controller 21 performs the processing of the step S113 of FIG. 5B. When the vehicle running speed is not less than the predetermined speed, the hybrid controller 21 determines in a step S112 whether or not the SOC of the battery 24 is less than a predetermined value. The determination here is identical to that of the step S103.

When the SOC of the battery 24 is less than the predetermined value, the hybrid controller 21 performs the processings from the step S104 onward. In other words, the rotation of the second motor/generator 4 is fixed to zero, and the torque output by the engine 2 is used in driving the drive wheels 8 and in power generation by the first motor/generator 3.

On the other hand, when the SOC of the battery 24 is not less than the predetermined amount, the hybrid controller 21 repeats the processings from the step S10 onward. In other words, driving of the drive wheels 8 is performed by only the output of the first motor/generator 3.

Thus, when a failure occurs in the second motor/generator 4, the hybrid controller 21 uses the output of the engine 2 solely for vehicle running, or commonly for both vehicle running and charging of the battery 24, based on the SOC of the battery 24.

Next, referring to FIG. 5B, when it is determined in the processes described above in the step S107 or in the step S111 that the vehicle running speed is less than the predetermined speed, the hybrid controller 21 determines in the step S113 whether or not the electromagnetic clutch 11 is in an engaged position. When the electromagnetic clutch 11 is in an engaged position, in a step S114, the hybrid controller 21 outputs a control request to the engine controller 22, releasing the electromagnetic clutch 11.

When the sun gear S is fixed, the rotation torque input from the drive wheels 8 to the ring gear R during deceleration is input to the engine 2 exclusively through the planet carrier C,. In other words, a state results where the drive wheels 8 and the engine 2 are directly connected according to a fixed gear ratio.

The rotation speed of the engine 2 therefore drops below an idling rotation speed when the vehicle running speed decreases to become equal to or less than the predetermined speed, and an engine stall may occur as a result. Releasing of the electromagnetic clutch 11 is performed in the step S114 in order to avoid such engine stall.

Figure 5G:
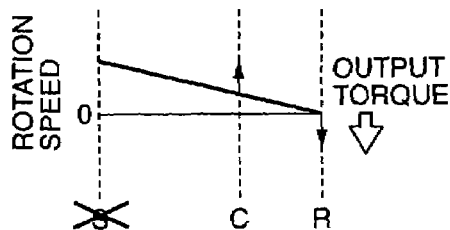

Next, in a step S115, the hybrid controller 21 causes the first motor/generator 3 to perform regenerative power generation by outputting a control signal to the motor control portion 25. As shown in FIG. 5G, while the engine 2 maintains an idling rotation speed, rotation of the drive wheels 8 is reduced through the ring gear R due to rotational resistance accompanying the regenerative power generation of the first motor/generator 3.

In the step S13, when the electromagnetic clutch 11 is not in an engaged position, that is, when the electromagnetic clutch 11 is already released, the hybrid controller 21 skips the processing of the step S114 and performs the processing of the step S115.

Next, in a step S116, the hybrid controller 21 confirms that the vehicle running speed has become zero.

Figure 5H:
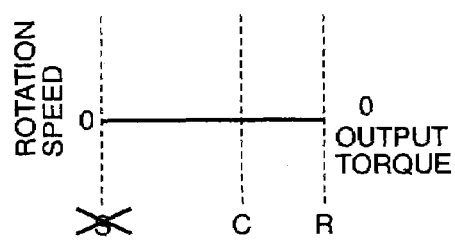

Next, in a step S117, the hybrid controller 21 outputs a signal to the engine controller 22, thus stopping rotation of the engine 2. Referring to FIG. 5H, in this state rotation of the ring gear R, rotation of the planet carrier C, and rotation of the sun gear S all stop.

Next, in a step S118, the hybrid controller 21 determines whether or not operations to restart the vehicle are underway. Specifically, the hybrid controller 21 determines whether or not the accelerator pedal has been depressed from the accelerator pedal depression amount.

When the determination of the step S118 is negative, the hybrid controller 21 ends the routine.

When the determination of the step S118 is positive, in a step S119, the hybrid controller 21 outputs a control request to the engine controller 22, thus engaging the clutch 11.

Figure 5I:
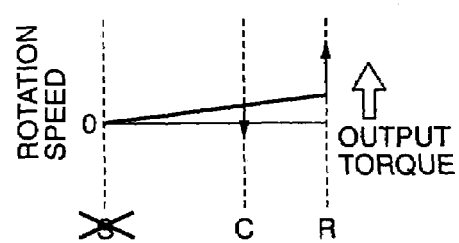
Figure 5J:
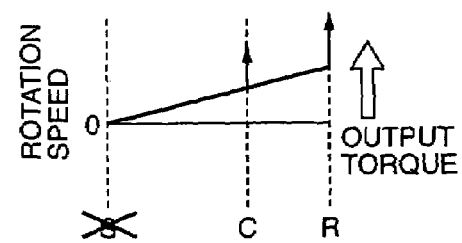

Next, in a step S120, the hybrid controller 21 outputs a control signal to the motor control portion 25, thus operating the first generator/motor 3. Referring to FIG. 5I, the torque output by the first generator/motor 3 alone drives the drive wheels 8 and performs cranking of the engine 2.

Next, in a step S121, the hybrid controller 21 outputs a signal to the engine controller 22, starting the engine 2.

After the engine 2 starts, the hybrid controller 21 repeats the processings from the step S103 onward.

By executing this routine, the vehicle can be made to run using the engine 2 and the first motor/generator 3, even when the second motor/generator 4 fails. Further, when the SOC of the battery 24 decreases, the first motor/generator 3 can be made to perform power generation using the torque output by the engine 2. Charging of the battery 24 can thus be performed.

Figure 6A:
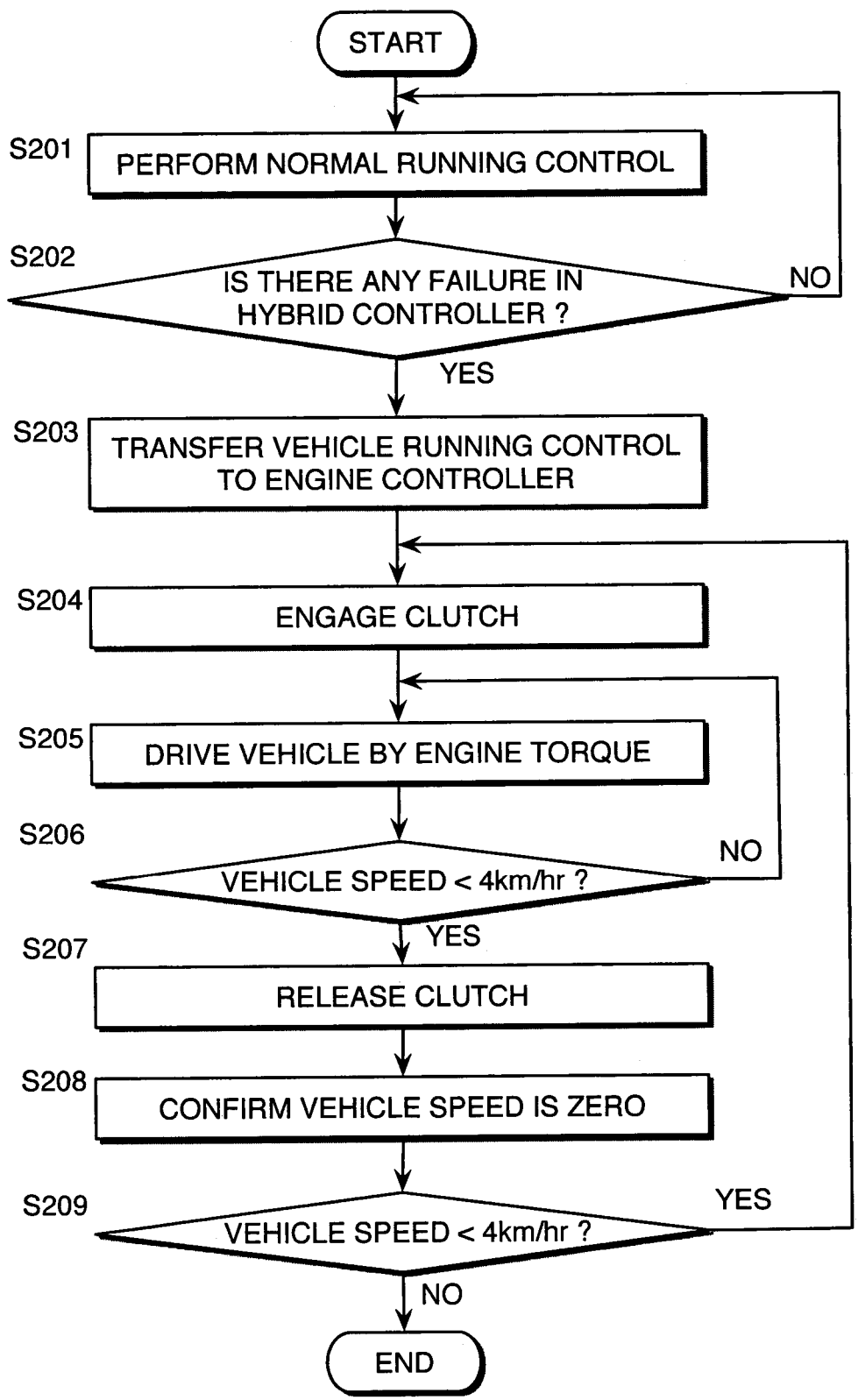
FIG. 6A is a flowchart that explains a failsafe control routine performed when there is a controller failure.

Referring to FIGS. 6A to 6G, control of the drive device by the control system relating to a failure of the hybrid controller 21 will be explained next. FIG. 6A shows a routine that the engine controller 22 and the self-diagnostic device 27 execute. FIGS. 6B to 6G show the rotation speed and torque of each gear achieved by executing each process of the control routine. Execution of the routine also begins at the same time as the hybrid electric vehicle starts to move, and the routine continues to be executed until the hybrid electric vehicle stops running.

The routines of FIGS. 4A and 4B, and the routines of FIGS. 5A and 5B are all executed by the hybrid controller 21. This control routine of FIG. 6, however, which relates to failure of the hybrid controller 21, is mainly executed by the engine controller 22.

Figure 6B:
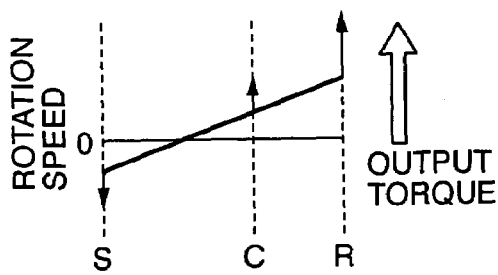
FIGS. 6B to 6G are collinear diagrams that correspond to processes in the flowchart of FIG. 6A, according to this invention.

In a step S201, the hybrid controller 21 performs normal running control of the drive device by outputting control commands to the motor control portion 25, to the generator control portion 26, and to the engine controller 22. This is the same processing as that of the step S1 of FIG. 4A, and torque is distributed as shown in FIG. 6B based on this control. The second motor/generator 4 performs power generation.

In a step S202, the self-diagnostic device 27 determines whether or not the hybrid controller 21 has failed. In order to do so, the self-diagnostic device 27 executes computations that are partially the same as those executed by the hybrid controller 21 relating to normal running control of the drive device. It is determined that the hybrid controller 21 has failed when there is a discrepancy in the computation results.

When the determination by the self-diagnostic device 27 in the step S202 is negative, normal running continues under the control of the hybrid controller 21.

When the determination of the step S202 is positive, in a step S203, the self-diagnostic device 27 passes running control over to the engine controller 22. However, it is only possible for the engine controller 22 to control operation of the engine 2 and engaging and releasing of the electromagnetic clutch 11. The engine controller 22 cannot control the first motor/generator 3 or the second motor/generator 4.

Figure 6C:
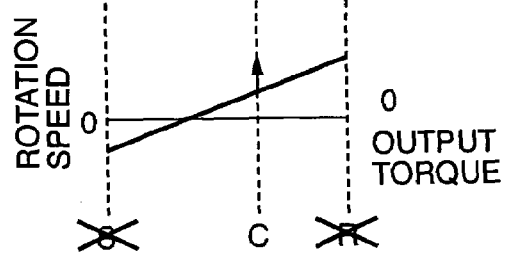

Referring to FIG. 6C, at the stage where control has been passed over to the engine controller 22, the engine 2 is rotating idle and the vehicle is running under its own momentum, and the first motor/generator 3 and the second motor/generator 4 run idle in response to rotation torque input.

Next, in a step S204, the engine controller 22 engages the electromagnetic clutch 11, and the engine 2 and the drive wheels 8 are thus joined at a fixed gear ratio.

Figure 6D:
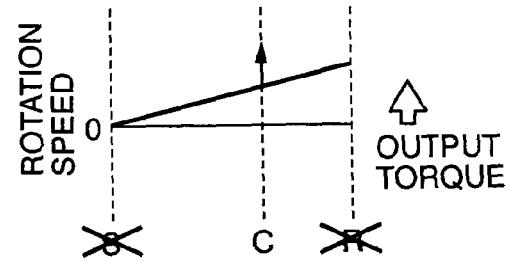
Figure 6E:
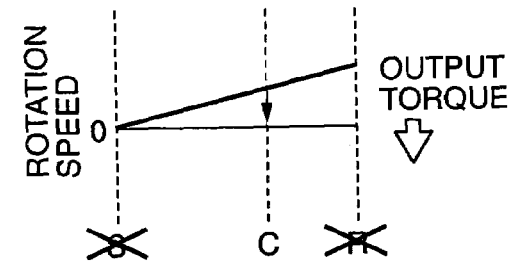

Next, in a step S205, the engine controller 22 performs output control of the engine 2 based on the accelerator pedal depression amount. Referring to FIG. 6D, the torque output by the engine 2 is transmitted to the drive wheels 8, and the vehicle thereafter runs by the torque output by the engine 2 in response to the accelerator pedal depression. Further, referring to FIG. 6E, when the accelerator pedal is released in this state, the engine 2 causes engine braking of the drive wheels 8.

Next, in a step S206, the engine controller 22 determines whether or not the vehicle is in a state immediately prior to stopping. Specifically, the engine controller 22 determines whether or not the vehicle running speed is less than a predetermined speed. The predetermined speed is set here to 4 kilometers/hour.

When the vehicle running speed is less than the predetermined speed, the engine controller 22 performs the processings from a step S207 onward. When the engine running speed is not less than the predetermined speed, the engine controller 22 continues vehicle running by the torque output by the engine 2 in the step S205.

In the step S207, the engine controller 22 releases the electromagnetic clutch 11. The drive wheels 8 and the engine 2 are directly joined at a fixed gear ration when the electromagnetic clutch 11 is engaged. Accordingly, the engine 2 will stall when the vehicle running speed drops below the predetermined speed. The processing of the step 207 is performed in order to prevent engine stalling.

Figure 6F:
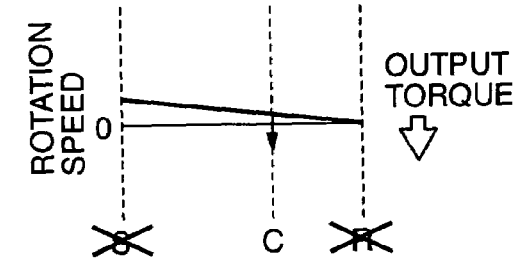
Figure 6G:
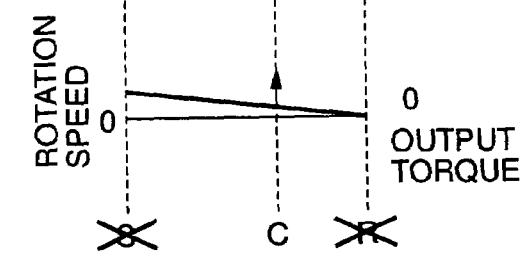

Referring to FIG. 6F, the sun gear S becomes able to freely rotate by releasing the electromagnetic clutch 11, and the engine 2 is released from being directly joined to the ring gear R. The engine 2 can therefore continue to rotate idle even if the vehicle running speed decreases further and the vehicle stops.

Next, in a step S208, the engine controller 22 verifies that the vehicle running speed has reached zero.

Next, in a step S209, a determination is made as to whether or not operations are being performed to restart the vehicle. Specifically, a determination of whether or not the accelerator pedal has been depressed is made from the accelerator pedal depression amount.

When the determination of the step S209 is positive, the engine controller 22 repeats the processings from the step S204 onward, causing the vehicle to run.

When the determination made in the step S209 is negative, the engine controller 22 ends the routine.

It should be noted that the engine 2 cannot be started again when the engine 2 stops in a state where the hybrid controller 21 has failed. Consequently, processing to stop the engine 2 is not performed in this routine. Stopping of the engine 2 is performed by an ignition switch that is provided to the vehicle.

Referring to FIGS. 7A to 7C, in a state where the hybrid controller 21 has failed, first the electromagnetic clutch 11 is engaged in the step S204 by executing this routine. As a result, as shown in FIG. 7C, the rotation speed of the second motor/generator 4 becomes zero. In this state, in the step S205, the torque output by the engine 2 is controlled according to the accelerator pedal depression amount, as shown in FIG. 7B. In FIG. 7B the output torque becomes negative when a driver has released the accelerator pedal and engine braking is in effect.

As shown in FIG. 7A, when the vehicle speed decreases below the preset velocity as a result of engine braking, the electromagnetic clutch. 11 is released in the step S207. As a result, the second motor/generator 4 becomes free to rotate, reductions in the rotation speed of the engine 2 are avoided, and an idling rotation state can be maintained.

According to this routine, the vehicle can therefore be made to run by only the torque output by the engine 2 when the hybrid controller 21 fails, no matter what the SOC of the battery 24. Further, engine stalls can be prevented, even when the vehicle stops.

The contents of Tokugan 2004-050046, with a filing date of Feb. 25, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, he embodiment described above relates to a drive device for a hybrid electric vehicle including all of the control routine for failure of the first motor/generator 3, the control routine for failure of the second motor/generator 4, and the control routine for failure of the hybrid controller 21.

However, the main subject of this invention can be appreciated from any of the control routines described above. In other words, the technical scope of this invention also includes drive devices that implement only any one of the three control routines described above.

In each of the above embodiments, the parameters required for control are detected using sensors, but this invention can be applied to any drive device which can perform the claimed control using the claimed parameters regardless of how the parameters are acquired.

The embodiments of this invention in which an exclusive property or privilege is claimed are defined as follows:

What is claimed is:

1. A drive device for a hybrid electric vehicle, the drive device comprising:
   a differential device comprising a first rotation element, a second rotation element, and a third rotation element that rotates according to relative rotation of the first rotation element and the second rotation element;
   an internal combustion engine connected to one of two rotation elements including the third rotation element;
   a first motor/generator and drive wheels that are connected to the other of the two rotation elements;
   a second motor/generator connected to a rotation element other than the two rotation elements;
   a battery that is electrically connected to the first motor/generator and to the second motor/generator;
   a restricting member that restricts rotation of the second motor/generator; and
   a programmable controller programmed to:
      detect a failure in one of the first motor/generator and the second motor/generator; and
      restrict rotation of the second motor/generator through the restricting member, when a failure is detected.

2. The drive device as defined in claim 1, the programmable controller is further programmed to not perform restriction of the rotation of the second motor/generator by the restricting member when a state of charge of the battery is below a predetermined state, in a case where a failure is detected in the first motor/generator.

3. The drive device as defined in claim 1, wherein the programmable controller is further programmed to release restriction of the rotation of the second motor/generator by the restricting member when the speed of the hybrid electric vehicle decreases to less than a predetermined speed in a state where the restricting member is restricting rotation of the second motor/generator.

4. The drive device as defined in claim 1, wherein the programmable controller is further programmed to stop operation of the second motor/generator before restricting the rotation of the second motor/generator through the restricting member.

5. The drive device as defined in claim 1, wherein the differential device comprises a planetary gear set that comprises a sun gear, a ring gear, and a planet carrier as the third rotation element.

6. The drive device as defined in claim 5, wherein the first motor/generator and the drive wheels are connected to the ring gear, the second motor/generator is connected to the sun gear, and the engine is connected to the planet carrier.

7. The drive device as defined in claim 1, wherein the restricting member comprises an electromagnetic clutch that is provided between a rotation shaft of the second motor/generator and a fixing portion that supports the rotation shaft.

8. The drive device as defined in claim 1, wherein the programmable controller is further programmed to not perform restriction of the rotation of the second motor/generator by the restricting member when a state of charge of the battery exceeds a predetermined state, in a case where a failure is detected in the second motor/generator.

9. The drive device as defined in claim 1, wherein the programmable controller is further programmed to control electric power supplied from the battery and electric power charged to the battery, the driving device further comprises an engine controller programmed to control the torque output by the engine, and a third controller programmed to detect a failure of the hybrid controller, and wherein the engine controller is further programmed to restrict rotation of the second motor/generator, through the restricting member, when a failure of the hybrid controller is detected.

10. A drive device for a hybrid electric vehicle, the drive device comprising:
    a differential device comprising a first rotation element, a second rotation element, and a third rotation element that rotates according to relative rotation of the first rotation element and the second rotation element;
    an internal combustion engine connected to one of two rotation elements including the third rotation element;
    a first motor/generator and drive wheels that are connected to the other of the two rotation elements;
    a second motor/generator connected to a rotation element other than the two rotation elements;
    a battery that is electrically connected to the first motor/generator and to the second motor/generator;
    a restricting member that restricts rotation of the second motor/generator;
    means for detecting a failure in one of the first motor/generator and the second motor/generator; and
    means for restricting rotation of the second motor/generator through the restricting member, when a failure is detected.

11. A control method of a drive device for a hybrid electric vehicle, the drive device comprising a differential device comprising a first rotation element, a second rotation element, and a third rotation element that rotates according to relative rotation of the first rotation element and the second rotation element, an internal combustion engine connected to one of two rotation elements including the third rotation element, a first motor/generator and drive wheels that are connected to the other of the two rotation elements, a second motor/generator connected to a rotation element other than the two rotation elements, a battery that is electrically connected to the first motor/generator and to the second motor/generator, and a restricting member that restricts rotation of the second motor/generator, the method comprising:
    detecting a failure in one of the first motor/generator and the second motor/generator; and
    restricting rotation of the second motor/generator through the restricting member, when a failure is detected.

* * * * *